United States Patent
Newsom et al.

(10) Patent No.: US 7,831,028 B2
(45) Date of Patent: Nov. 9, 2010

(54) SYSTEM AND METHOD FOR CALL TRACKING

(76) Inventors: Nicklaas D. Newsom, 17595 Harvard Ave., Suite C105, Irvine, CA (US) 92614; Mathew A. Grofsky, 17595 Harvard Ave., Suite C105, Irvine, CA (US) 92614

( * ) Notice: Subject to any disclaimer, the term of this patent is extended or adjusted under 35 U.S.C. 154(b) by 1267 days.

(21) Appl. No.: 11/387,236

(22) Filed: Mar. 22, 2006

(65) Prior Publication Data
US 2008/0043954 A1 Feb. 21, 2008

(51) Int. Cl.
*H04M 15/00* (2006.01)
(52) U.S. Cl. .............. 379/114.13; 705/14.4; 705/14.41; 705/14.45
(58) Field of Classification Search ......... 379/111–113, 379/115, 116, 119, 121.01, 127.01, 133–136, 379/207.01; 705/1, 7–10, 50, 53, 59, 14.4, 705/14.41, 14.42, 14.43, 14.45, 14.49, 14.52, 705/14.56; 725/10, 14, 34, 35, 37, 42, 46, 725/112
See application file for complete search history.

(56) References Cited

U.S. PATENT DOCUMENTS

| | | | | |
|---|---|---|---|---|
| 4,850,007 | A * | 7/1989 | Marino et al. | 379/114.13 |
| 4,989,234 | A * | 1/1991 | Schakowsky et al. | 379/92.03 |
| 5,448,625 | A * | 9/1995 | Lederman | 379/88.25 |
| 5,506,893 | A * | 4/1996 | Buscher et al. | 379/115.02 |
| 5,606,600 | A * | 2/1997 | Elliott et al. | 379/112.09 |
| 5,636,346 | A * | 6/1997 | Saxe | 705/1.1 |
| 5,740,234 | A * | 4/1998 | Black et al. | 379/112.01 |
| 5,903,635 | A * | 5/1999 | Kaplan | 379/112.01 |
| 6,006,197 | A * | 12/1999 | d'Eon et al. | 705/10 |
| 6,084,953 | A * | 7/2000 | Bardenheuer et al. | 379/114.01 |
| 6,286,005 | B1 * | 9/2001 | Cannon | 1/1 |
| 6,470,079 | B1 * | 10/2002 | Benson | 379/114.13 |
| 7,302,467 | B2 * | 11/2007 | Matsuda et al. | 709/204 |
| 7,369,651 | B2 * | 5/2008 | Brandt et al. | 379/126 |
| 2002/0016174 | A1 | 2/2002 | Gibson et al. | |
| 2006/0074746 | A1 | 4/2006 | Kline et al. | |
| 2006/0093097 | A1 * | 5/2006 | Chang | 379/88.01 |

(Continued)

OTHER PUBLICATIONS

Yada, K. Codiro, "A New System for Obtaining Data Concerning Consumer Behavior Based on Data factors of High Interest Determined by the Analyst.", Fac. of Commerce, Kansai University, Osaka, Japan, Soft Computing, Jun. 2007, p. 811-817 (Abstract Only).

(Continued)

*Primary Examiner*—Binh K Tieu
(74) *Attorney, Agent, or Firm*—Klein, O'Neill & Singh, LLP

(57) ABSTRACT

A system for collecting caller information comprises an interexchange switch adapted to extract caller information associated with a call directed to a telephone number, the interexchange switch further adapted to forward caller information to a server manager, the server manager adapted to forward caller information to a server. The server stores the caller information and parses campaign information from the caller information. The system accumulates the campaign information and forwards the campaign information over the Internet. The server manager may be adapted to execute a script. The script may include executing an option selected from the group consisting of: recording the call, activating voicemail, recording a lost lead capture, requesting the caller's name, and forwarding the call.

11 Claims, 7 Drawing Sheets

U.S. PATENT DOCUMENTS

| | | | |
|---|---|---|---|
| 2006/0212409 A1* | 9/2006 | Steelberg et al. | 705/400 |
| 2006/0224693 A1 | 10/2006 | Gaidemak et al. | |
| 2007/0016474 A1 | 1/2007 | Kannan et al. | |
| 2007/0041527 A1 | 2/2007 | Tuchman et al. | |
| 2007/0118426 A1* | 5/2007 | Barnes, Jr. | 705/14 |
| 2007/0162926 A1* | 7/2007 | Steelberg et al. | 725/34 |
| 2007/0226053 A1* | 9/2007 | Carl et al. | 705/14 |
| 2008/0010084 A1* | 1/2008 | Castro et al. | 705/1 |

OTHER PUBLICATIONS

Hosford, C. "Campaigns being managed via Web", Marketing Resource Management, BTO, Mar. 12, 2007, vol. 92 No. 3 p. 16.

Liao et al., "Mining Customer Knowledge for Electronic Catalog Marketing", Tamkang University, Department Management Science Expert Systems with Applications, Nov. 2004, vol. 27 p. 521-532 (Abstract Only).

Biggs, G. "Implementing data mining in a marketing data warehouse development.", Conference: Proceedings of the Fourth International Conference on the Practical Application of Knowledge Discovery and Data Mining, Apr. 11-13, 2000, p. 15-18 (Abstract Only).

Office Action from USPTO dated Mar. 18, 2009 for U.S. Appl. No. 11/184,180.

* cited by examiner

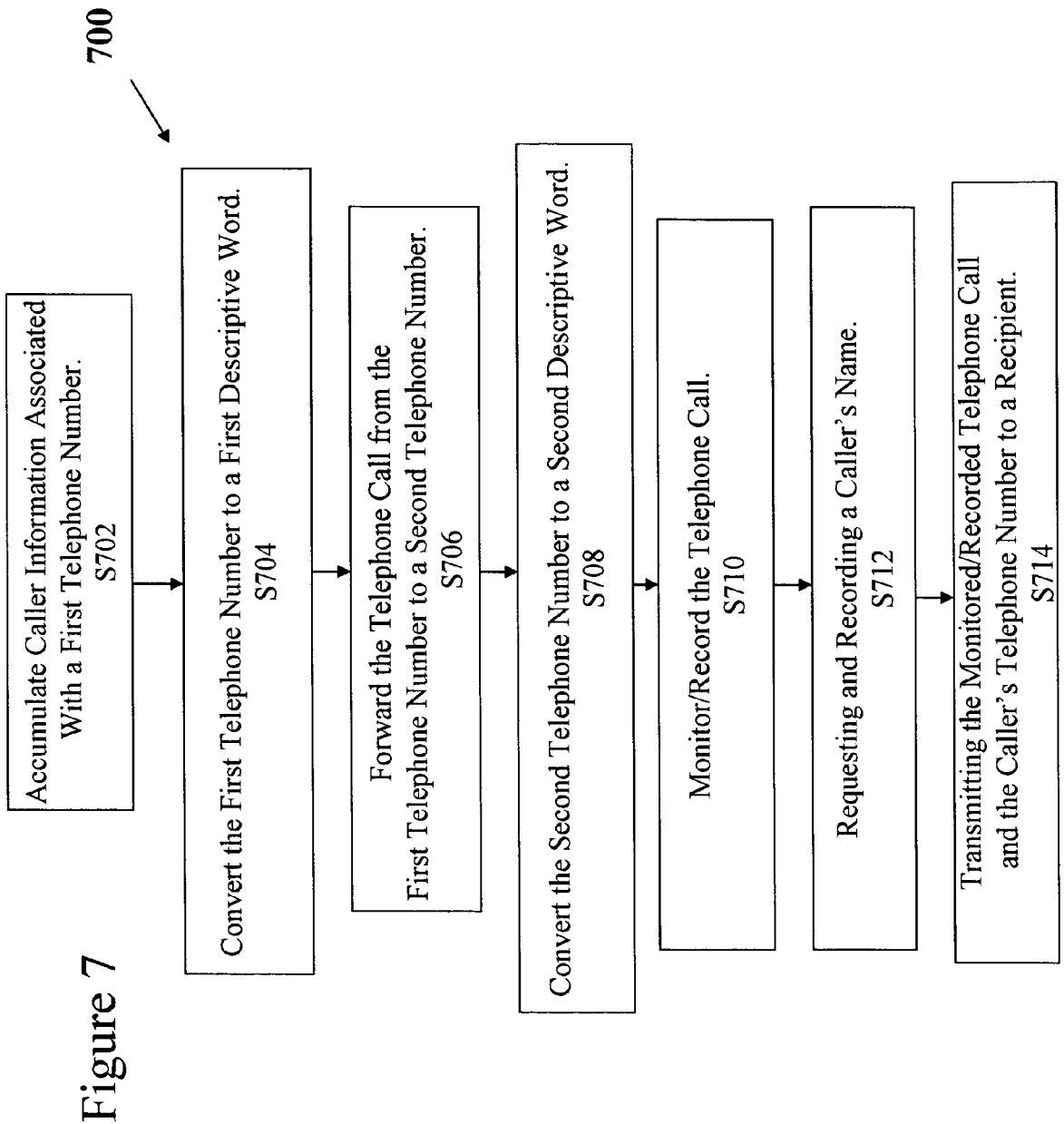

SYSTEM AND METHOD FOR CALL TRACKING

CROSS REFERENCE TO RELATED APPLICATIONS

The present application contains subject matter related to that disclosed in pending application Ser. No. 11/184,180, filed on Jul. 19, 2005, entitled System and Method for collecting and processing caller information.

BACKGROUND OF THE INVENTION

The present invention relates generally to telecommunications systems. More particularly, the present invention relates to telecommunications systems for reporting caller data for calls made to particular telephone numbers.

Advertisers seek to gauge the efficacy of advertising campaigns. These advertisers attempt to target advertising to an intended audience by selecting the advertising campaign media, selecting an appropriate frequency of the campaign, selecting the nature of the advertisements, and other techniques. Advertisers may place advertisements in newspapers, magazines, trade journals, direct mailings, directories, radio, and television. Advertisers do not have a very accurate and timely mechanism for gauging the effectiveness of their advertising campaigns.

Examples of measuring the effectiveness of advertising campaigns include the use of different directory numbers (telephone numbers) for each advertising campaign. In that way, advertisers may analyze telephone records monthly and count the number of calls placed to particular markets. However, this practice is crude, inefficient, and untimely. An automated system that is capable of providing the advertiser with tailored and accurate reports on which advertising campaigns are effective has eluded those skilled in the art.

Additionally, if an advertiser could immediately evaluate the effectiveness of a campaign, the advertiser has the opportunity to immediately discontinue a costly advertising campaign. Reviewing monthly phone bills or monthly reporting would be inadequate to serve the advertiser's needs. In addition, such reporting does not capture a crucial piece of information to the advertiser (e.g., the caller's gender and what calls were attempted to the advertiser, but were not completed, because of a busy signal or no answer). That information would not be available through conventional telephone billing or reporting services. The advertiser would very much like to identify potential customers for whom the advertising was effective, but whose needs went unsatisfied, for example, because of no answer or a busy signal.

It would thus be advantageous to provide a system and a method for collecting caller information and processing the information after collection.

SUMMARY OF THE INVENTION

In one aspect of the present invention, a system for collecting caller information comprises an interexchange switch adapted to extract caller information associated with a call directed to a telephone number associated with the interexchange switch, the interexchange switch further adapted to forward caller information to a server manager, a server, the server manager adapted to forward caller information to the server, the server being adapted to store the caller information and to parse campaign information from the caller information, the campaign information comprising caller information associated with a call to the telephone number; and a database operationally connected to the server and adapted to accumulate the campaign information and to forward the campaign information over the Internet in response to a request for the campaign information associated with the telephone number.

In another aspect of the present invention, a method for collecting caller information comprises sending a call from a caller to a server manager; managing interaction between the server manager and a processor; obtaining a company ID number based on the number called; asking the caller questions; recording responses to the caller questions; sending the recorded responses to the server manager; processing the responses; and merging the responses.

In yet another aspect of the present invention, a method for collecting caller information comprises accumulating caller information associated with a telephone number; formulating a report based on the accumulated calling information for the telephone number; formatting the report for transmission over the Internet; and transmitting the formatted report over the Internet to a server manager.

In still another aspect of the present invention, a method for collecting caller information comprises monitoring caller information collected during a telephone call; generating an alert associated with the caller information, in response to a triggering event; and transmitting the alert to a server manager.

In still yet another aspect of the present invention, a method for processing caller information comprises answering a telephone call from a caller to a telephone number; querying a database to determine the identity of the entity assigned the telephone number; building a script; sending the script to a server manager; asking the caller questions; recording responses to the questions; sending the recorded responses to the server; and processing the merged responses.

In a further aspect of the present invention, a method for processing caller information comprises answering a telephone call from a caller to a telephone number; assigning a call ID number to the telephone call; assigning a caller ID number to the caller; assigning a campaign ID number to the telephone number; posting the call ID number and the called telephone number to a URL on a server; querying a database to determine the identity of the entity assigned the telephone number; building a script; sending the script to a server manager; asking the caller questions; recording responses to the questions; sending the recorded responses to the server; merging the recorded responses; and processing the merged responses.

In another aspect of the present invention, a system for collecting caller information comprises an interexchange switch adapted to extract caller information associated with a call directed to a telephone number associated with the interexchange switch, the interexchange switch further adapted to forward caller information to a server manager, a server, the server manager adapted to contact the server and forward caller information to the server, the server being adapted to store the caller information and to parse campaign information from the caller information, the campaign information comprising caller information associated with a call to the telephone number; and a database operationally connected to the server and adapted to accumulate the campaign information and to forward the campaign information over the Internet in response to a request for the campaign information associated with the telephone number; wherein the server manager is adapted to execute a script.

In still another aspect of the present invention, a method for processing caller information comprises answering a telephone call from a caller to a telephone number; contacting a server; generating a script; querying a database to determine the identity of the entity assigned the telephone number; sending the script to a server manager; executing the script; recording a status of the telephone call; processing responses; recording the telephone call; terminating the telephone call; and transmitting the recording of the telephone call via the Internet.

In yet another aspect of the present invention, a method for processing caller information comprises accumulating caller information associated with a first telephone number; converting the first telephone number to a first descriptive word; forwarding the telephone call from the first telephone number to a second telephone number; converting the second telephone number to a second descriptive word; monitoring the telephone call; requesting and recording a caller's name, for example their first name; and transmitting the monitored telephone call and the caller's telephone number to a recipient.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 7 schematically represents a series of steps of a method for monitoring and reporting caller information, according to an embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides a system and method for collecting caller information and managing records of the caller information. The system produced according to the present invention may find beneficial use for fund-raising campaigns (e.g., seeking political contributions or donations to non-profit organizations). The system may also be useful for conducting the sale of products and services.

Although the following discussion may use telephone communications in an exemplary fashion, it is to be understood that this discussion is not limiting and that the present invention may be used in other suitable applications. For example, the present invention may be used for other forms of communication, such as radio, VOIP (Voice Over Internet Protocol), facsimile communication, electronic mail ("e-mail"), text messaging, and any other suitable forms of communication.

The present invention may be used to manage telephone calls to specific telephone numbers, such as reverse-billing numbers ("toll-free numbers"). The present invention enables a caller to interact with a server manager without needing a simultaneous connection to a call information processor or a data collector, unlike conventional telephone campaign systems that entail a simultaneous three-way connection between a caller, a server manager, and a call information processor or a data collector. The present invention may be used to process call information in batches.

Figure 1:
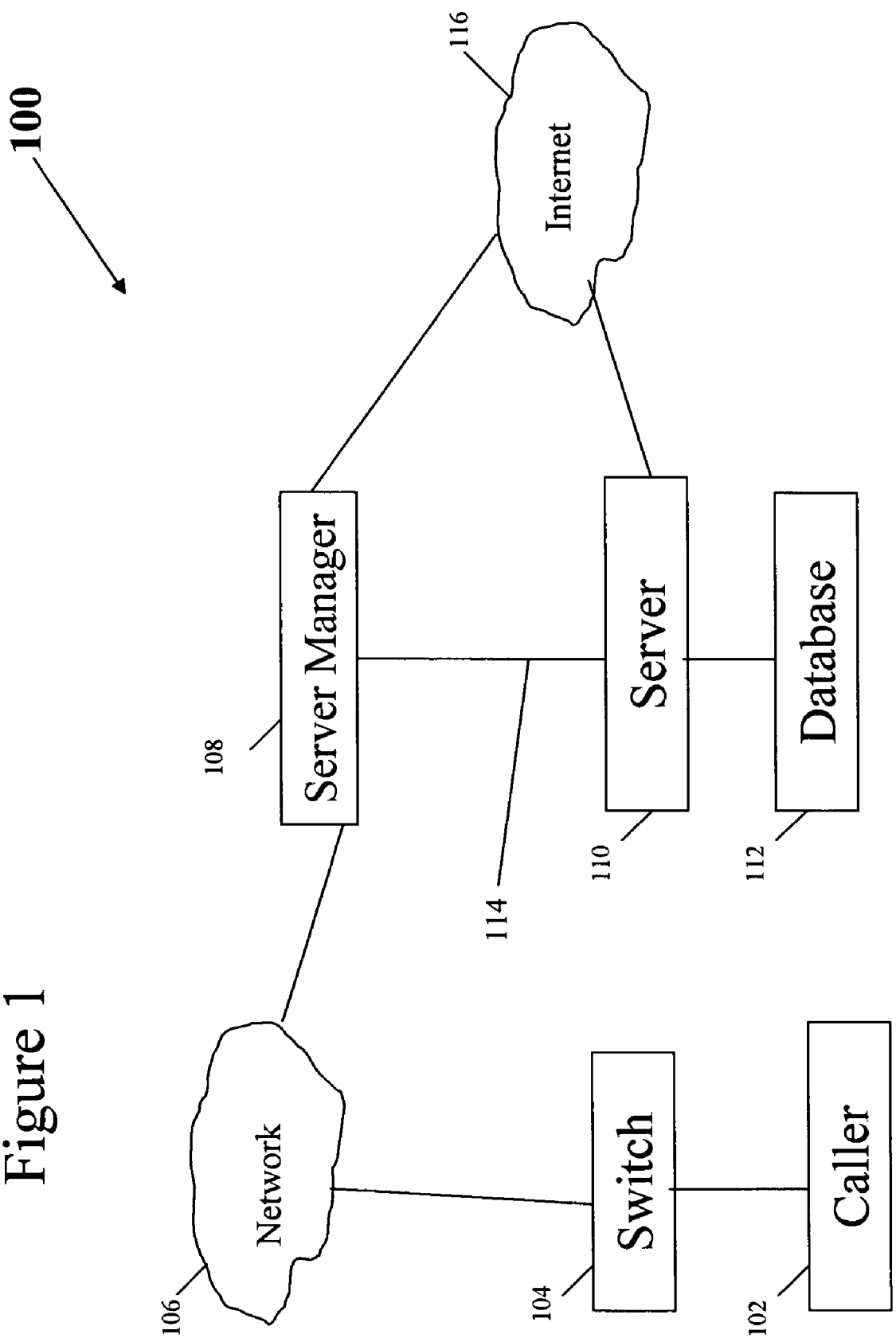
FIG. 1 is a block diagram of a telecommunications system, according to an embodiment of the present invention.

FIG. 1 show a block diagram of a telecommunications system 100. A caller 102 makes a telephone call that is controlled by a switch 104, such as an interexchange switch or a tandem switch. The call is handled by a telephone network 106, such as a Public Switch Telephone Network ("PSTN"). The telephone network 106 may be a conventional telephone network that performs conventional telephone services such as connecting one user of the network 106 to another user to complete the telephone call.

The telephone call may be connected with a server manager 108. The server manager 108 may be another user (as described above) to complete the telephone call. The server manager 108 may be a computer system that asks the caller questions, records responses, and sends the recorded responses, after the call has ended, to a server 110.

Recorded telephone calls may be reviewed later. For example, recorded telephone calls may be downloaded from the server manager 108 periodically (for example, every ten minutes) for review. Recorded telephone calls may be automatically deleted at a later time. For example, recorded telephone calls may be deleted every morning.

The server 110 receives the recorded responses from the server manager 108 and stores the responses in a database 112. The server 110 is operationally connected to the server manager 108 by either a direct connection 114 or via the Internet 116.

Continuing with FIG. 1, the system 100 for collecting caller information comprises the interexchange switch 104 adapted to extract caller information associated with a call, from the caller 102, directed to a telephone number associated with the interexchange switch 104, the interexchange switch 104 further adapted to forward caller information to the server manager 108, the server manager 108 being adapted to contact the server 110 and forward caller information to the server 110.

The server 110 is adapted to store the caller information and to parse campaign information from the caller information, the campaign information comprising caller information associated with a call to the telephone number, including a caller's first name.

The server 110 may be further adapted to prepare a report based on the campaign information in response to a request for the campaign information. Access to the campaign information may be controlled such that the server only accepts authorized requests from appropriate entities. For example, a campaign manager for a non-profit organization's fund-raising effort may be the only individual entitled to retrieve a report from the server.

The report may comprise a listing of attempted calls to the telephone number that were not answered. The report may comprise a listing of attempted calls to the telephone number that resulted in a busy signal. The report may also comprise a listing of calls with a duration of less than a predetermined elapsed time (for example, when a call lasts less than thirty seconds). A listing may be transmitted via the Internet.

The database 112 is adapted to accumulate the campaign information and to forward the campaign information over the Internet 116 in response to an authorized request for the campaign information associated with the telephone number.

The caller information may include a calling party directory number associated with the party initiating the call. The caller information may include an indication that the call received a busy signal when an attempt was made to connect the call to the telephone number. The caller information may include an indication that the call was not answered.

Figure 2:
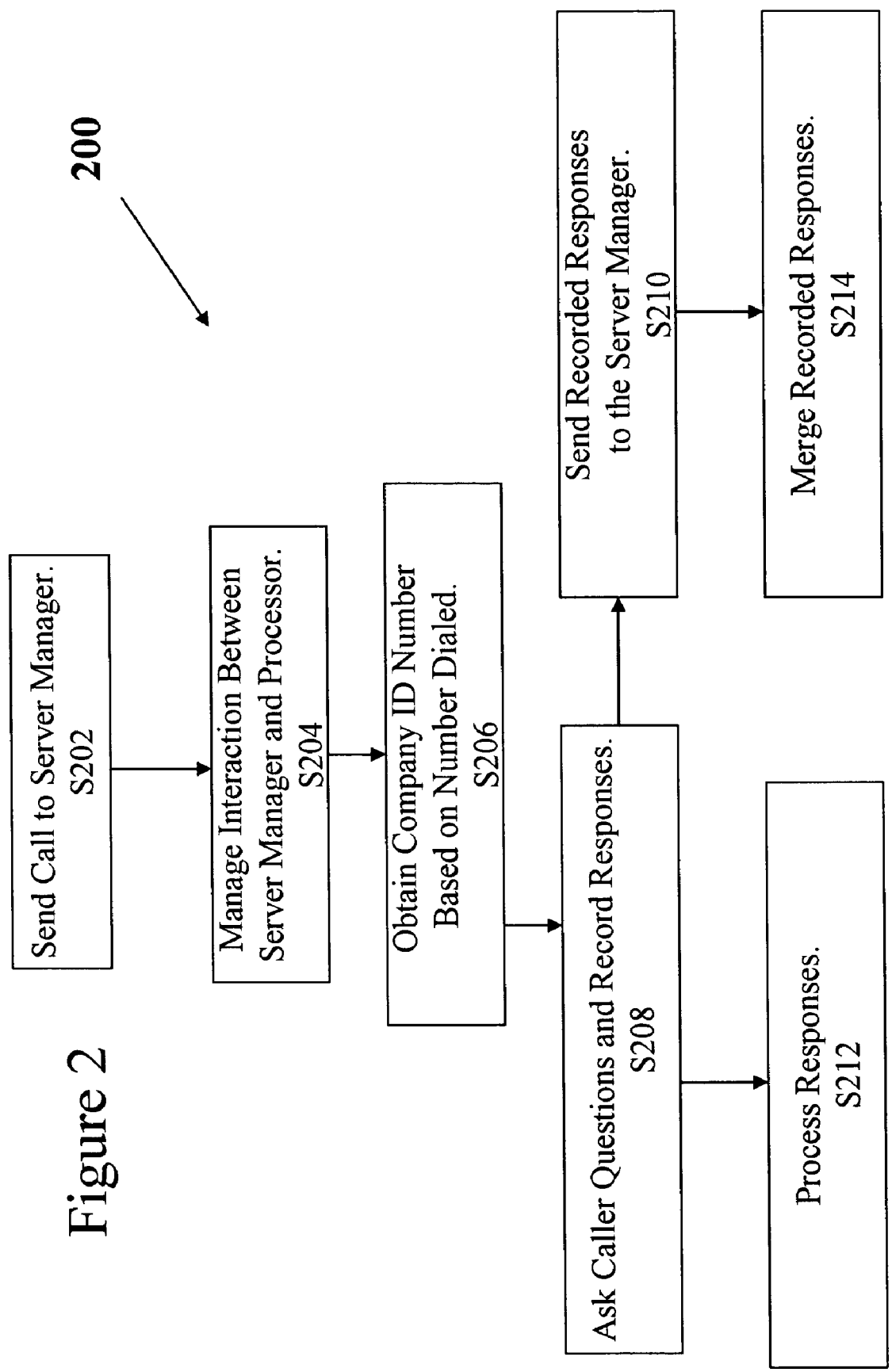
FIG. 2 schematically represents a series of steps of a method for collecting caller information, according to an embodiment of the present invention.

FIG. 2 shows a method 200 for collecting caller information that comprises a step S202 of sending a call from a caller to a server manager. A step S204 comprises managing interaction between the server manager and a processor.

A step S206 comprises obtaining a company ID or a campaign ID (identification) number based on the number called, while asking the caller questions comprises a step S208. Asking the caller questions may include providing audio prompts containing questions. The caller may provide audio responses that are recorded. A campaign ID number may be a number assigned to a particular campaign, such as a marketing campaign, a fund-raising effort for a charity, a political campaign, and the like.

A step S208 comprises recording responses to the caller questions (for example, recording the responses audibly into an individual WAV file).

Continuing with FIG. 2, sending the recorded responses to the server manager comprises a step S210. A step S212 comprises processing the responses, while merging the responses (for example, into a single WAV file) comprises a step S214.

Figure 3:
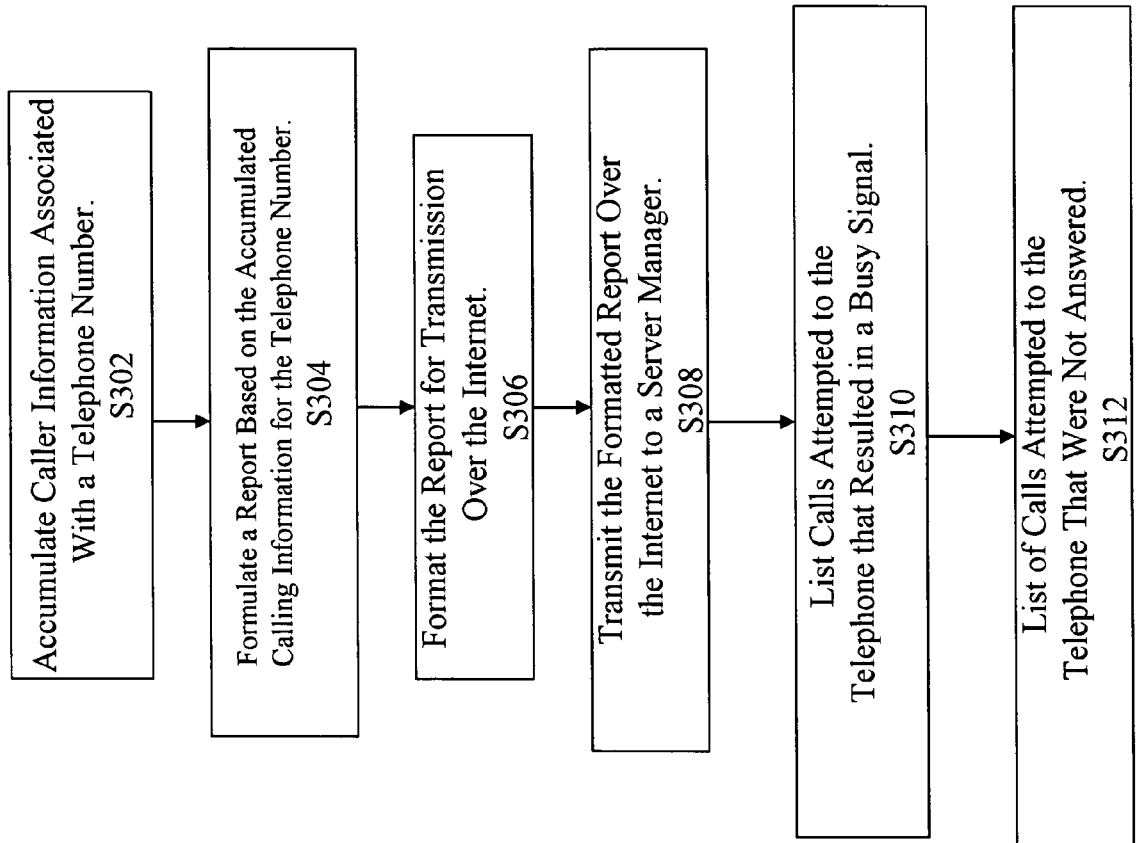
FIG. 3 schematically represents a series of steps of a method for collecting caller information, according to an embodiment of the present invention.

FIG. 3 shows a flow chart of a method 300 for collecting caller information. A step S302 comprises accumulating caller information associated with a telephone number. A step S304 comprises formulating a report based on the accumulated calling information for the telephone number. Formatting the report for transmission over the Internet comprises a step S306. The report may include a geographical indication of the location from which the call was initiated.

A step S308 comprises transmitting the formatted report over the Internet to a server manager. A step S310 comprises listing calls attempted to the telephone that resulted in a busy signal, while listing of calls attempted to the telephone that were not answered comprises a step S312.

Figure 4:
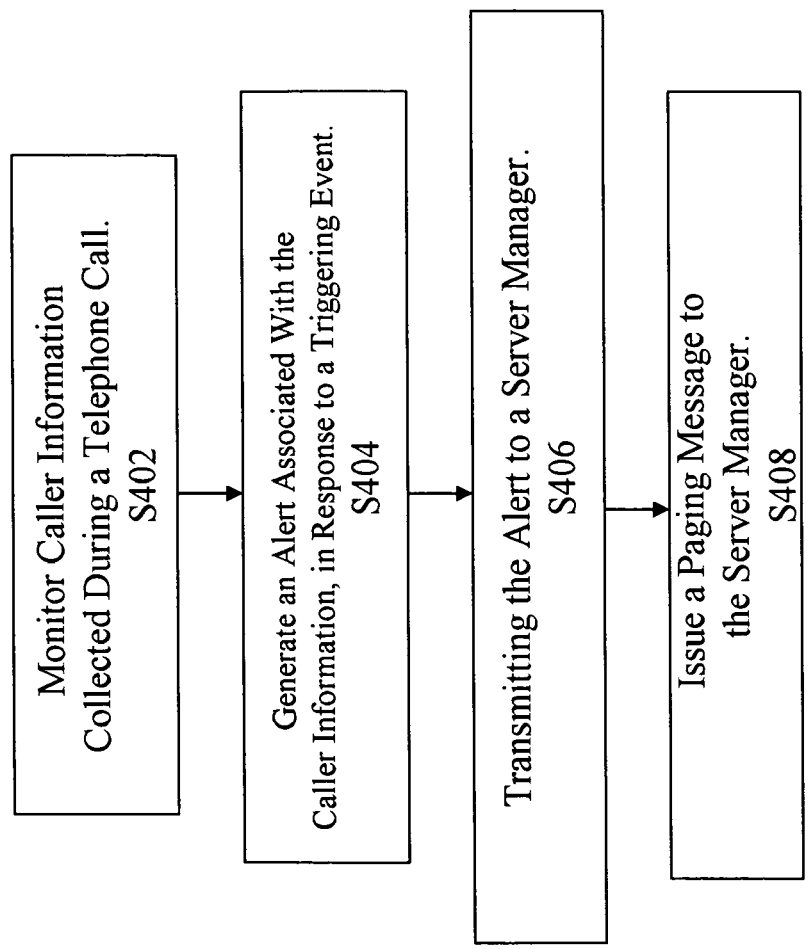
FIG. 4 schematically represents a series of steps of a method for collecting caller information, according to an embodiment of the present invention.

FIG. 4 shows another embodiment of the present invention in a flow chart of a method 400 for collecting caller information. The method 400 comprises a step S402 of monitoring caller information collected during a telephone call. A step S404 comprises generating an alert associated with the caller information, in response to a triggering event. The triggering event may include an attempted call to a telephone number that resulted in no answer or a busy signal.

Transmitting the alert to a server manager comprises a step S406. A step S408 comprises issuing a paging message to the server manager.

Figure 5:
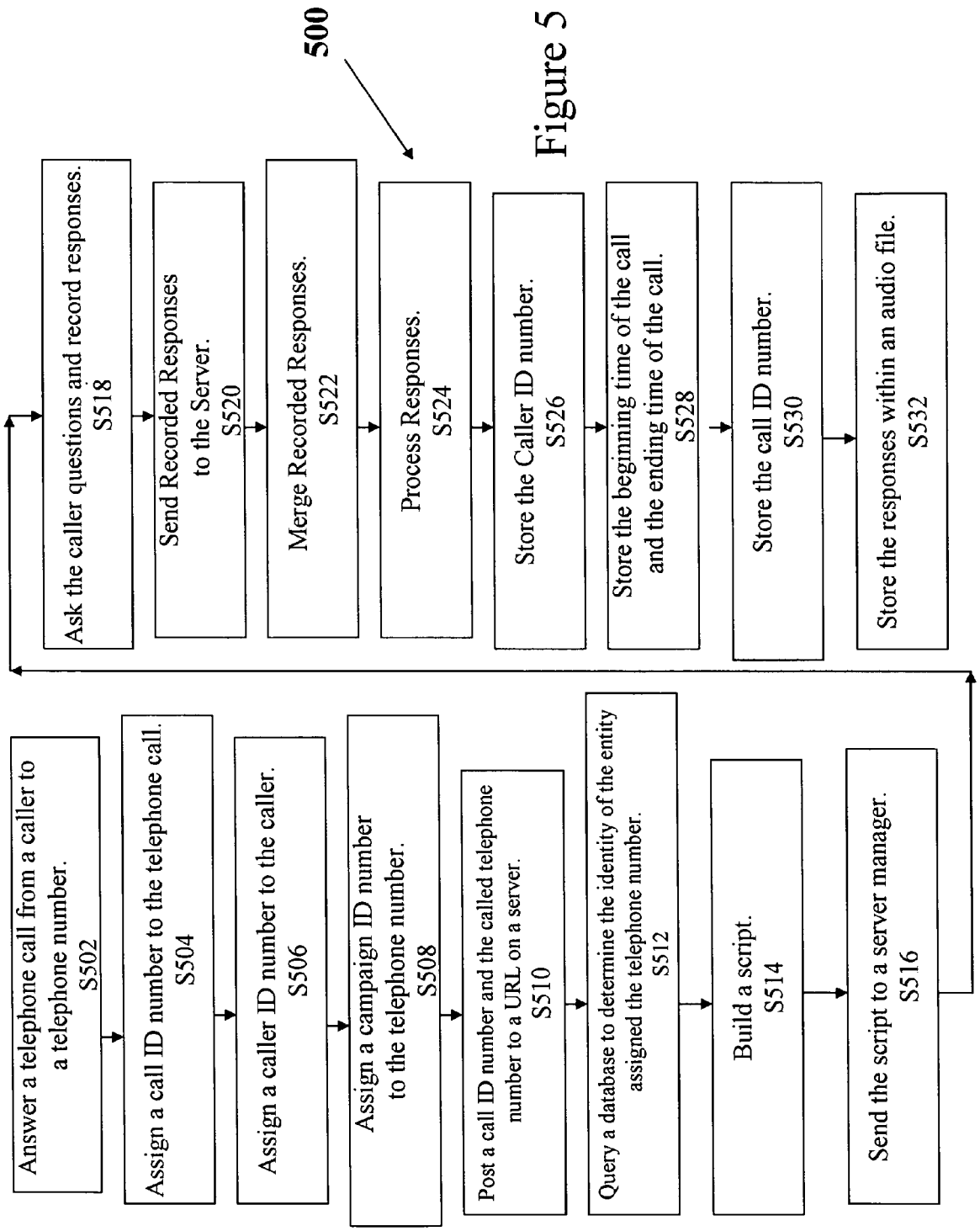
FIG. 5 schematically represents a series of steps of a method for collecting and processing caller information, according to an embodiment of the present invention.

FIG. 5 shows a flow chart of a method 500 for collecting caller information. A step S502 comprises answering a telephone call from a caller to a telephone number. Assigning a call ID (identification) number to the telephone call comprises a step S504. A step S506 comprises assigning a caller ID (identification) number to the caller. The caller ID may be used to search a reverse directory or database to identify the caller and the caller's location. A step S508 comprises assigning a campaign ID (identification) number to the telephone number. Posting a call ID (identification) number and the called telephone number to a URL (Uniform Resource Locator) on a server comprises a step S510. A step S512 comprises querying a database to determine the identity of the entity assigned the telephone number.

The server manager 108 is adapted to execute a script. The script may include executing an option selected from the group consisting of: recording the call, activating voicemail, recording a lost lead capture, requesting the caller's name, and forwarding the call. The system 100 may be used for bridging the caller to a telephone number assigned to the option.

A step S514 comprises building a script (such as a CallXML script) and a step S516 comprises sending the script to a server manager. Building the script may include using the server for building a CallXML script built specifically for a particular entity (for example, a non-profit organization). CallXML is a version of the Extensible Markup Language ("XML") as published by W3C Consortium, Version 1, Second Edition, October 2000, ©W3C. The particular script is then sent to the server manager to play the script on the telephone system. The script may create a first timestamp at the beginning of the call and store the first timestamp for later use. A generic CallXML file contains code that plays audio files (such as WAV files) that ask the caller for a name, address, and telephone number.

Asking a caller questions and recording responses to the caller questions comprise a step S518. As the caller answers each question, the response may be recorded over the telephone by the server manager and transmitted (for example, by FTP, File Transfer Protocol) to the server. The name of the files transmitted to the server may be a unique set of random numbers and letters.

After all of the questions are asked of the caller, a new script is generated by the server and then sent to the server manager (such as an action script). If the caller hangs up (or otherwise terminates the call), then a hang up process is initiated.

The hang up process includes the server generating a hang up script and storing data into a hang up table in the database. The data for a hang up may include the date, company ID, the called telephone number, a timestamp, and the call duration.

The action script may also be in a CallXML format. The action script may be generated specifically for the entity for which the called telephone number is assigned. The data within the action script is data created or received from the initial script. The data may include the date, the caller ID, the called number, the company ID, the randomly selected unique file name for the audio files, a notation that the file has not been transcribed, the location of the audio file, a notation whether the file has been merged, and the first timestamp. The action script may create a second timestamp. The call duration is calculated by subtracting the first timestamp from the second timestamp.

Sending the recorded responses (such as within the action script) to the server comprises a step S520. A step S522 comprises merging the recorded responses. The action script may merge several audio files (from several telephone calls) into one audio file for play back over the Internet via a URL.

Processing the recorded responses comprises a step S524. Storing the caller ID number comprises a step S526 while a step S528 comprises storing the beginning time of the call and the ending time of the call (such as to determine elapsed time of the call). Storing the call ID number comprises a step S530. A step S532 comprises storing the responses within an audio file (such as a WAV file).

The merged audio file may be in a queue and the audio file is ready to be transcribed by a transcriptionist. The transcriptionist listens to the audio file being played in a web browser and the transcriptionist types the information into a form and submits the information to the database for storage, where the data from the original call is linked to the stored information.

Once the data is transcribed, one may view specific data, including location, television stations associated locally with the called telephone number, the caller's gender, the geographical location of the caller, call duration, and the like.

Without transcription, reports may be prepared to list completed calls and calls where callers failed to complete the scripted questions and responses (incomplete calls).

Figure 6:
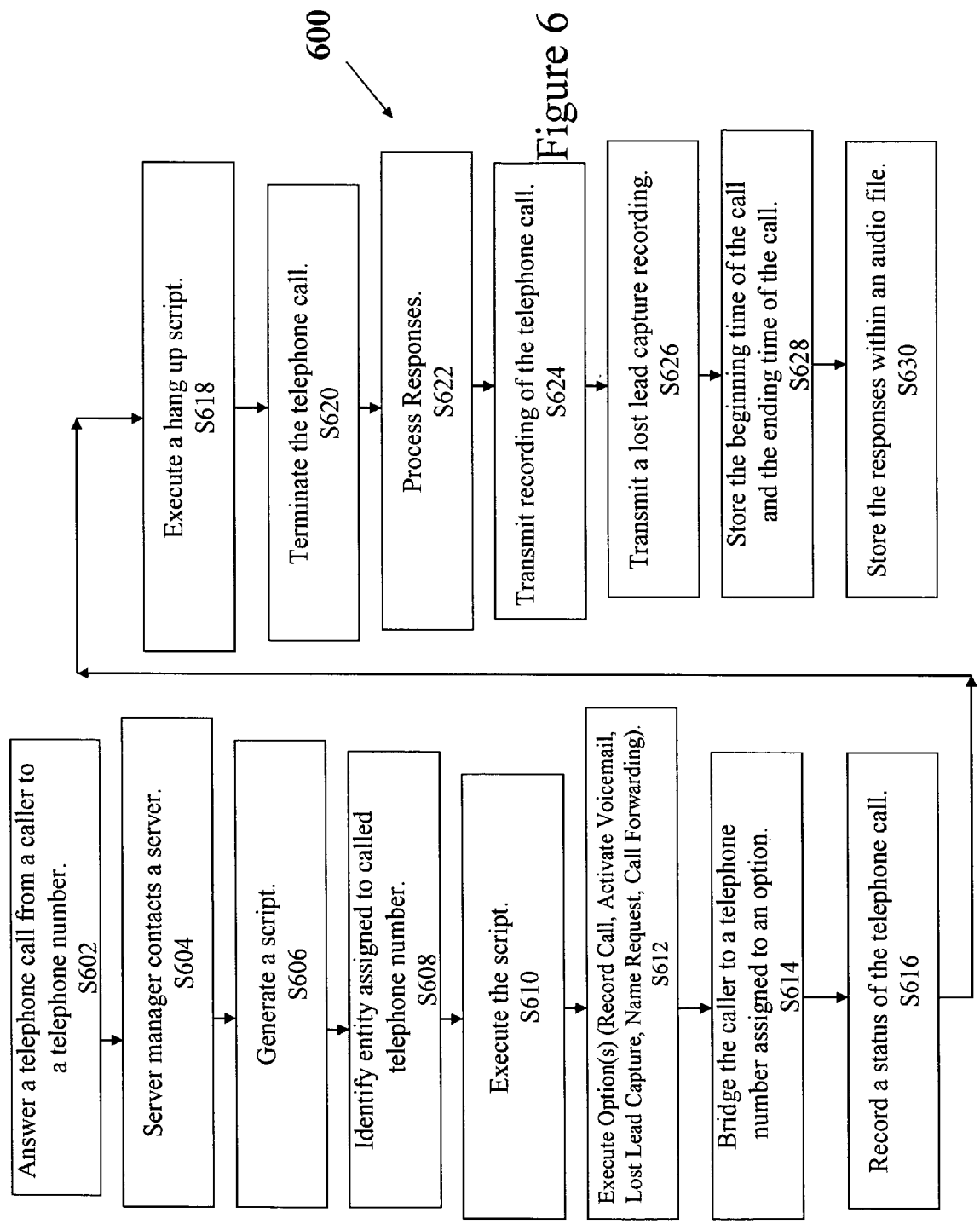
FIG. 6 schematically represents a series of steps of a method bridging a caller for executing a telephone option, including capturing a lost lead, according to an embodiment of the present invention.

Another aspect of the present invention is shown in FIG. 6 regarding a flow chart of a method 600 for collecting and processing caller information. A step S602 comprises answering a telephone call from a caller to a telephone number. Next, the server manager contacts the server in a step S604. A step S606 comprises generating a script. The script may be dynamically generated for the caller based on an entity's assigned set-up parameters.

A step S608 comprises querying a database to determine the identity of the entity assigned the telephone number. Assigning and posting a campaign ID (identification) number to the telephone number may be performed, as explained above regarding FIG. 5.

The script may be sent to a server manager 108. Executing the script comprises a step S610. The script identifies which entity owns the called number by querying a database on a server (not necessarily the same database 112 on server 110). A time stamp is made and a tracking database may be updated along with a database used for determining which calls to monitor.

The script may include executing an option selected from the group consisting of: recording the call, activating voicemail, recording a lost lead capture, requesting the caller's name, and forwarding the call.

The option of recording the call may be executed by monitoring and/or recording the call. For example, the telephone call may be monitored for quality assurance, including recording the telephone call.

The option of activating voicemail may be executed, for example, when the telephone call is not answered after a predetermined number of rings (such as three rings). The number of predetermined rings may be modified at any time.

The script may execute the option of requesting the caller's name for future use (including the caller's first name), such as follow-up communications between the entity and the caller.

The option of recording a lost lead capture may be performed regarding a lost lead system. A recording asks for the caller's name (including the caller's first name) at the beginning of the telephone call. If the call duration is less than a predetermined elapsed time (such as 30 seconds), then the recorded name is transmitted (for example, via e-mail), along with the caller's telephone number, to locations chosen by an entity. The entity would then have the ability to follow-up by contacting the caller with knowledge of the caller's name, telephone number, and other information available through directory or database searching with the caller's name and telephone number. For example, the entity may use a telephone company reverse directory to determine a caller's mailing address to send the caller campaign information via postal mail.

The script may execute the option of forwarding the call to one telephone number or multiple telephone numbers. The call may be forwarded for various reasons. For example, the telephone call may be forwarded to a predetermined telephone number if the caller pledges a large donation to the campaign.

A step S614 may comprise bridging the caller to a telephone number assigned to the option (such as voicemail, lost lead capture, monitoring/recording a call, and the like). For example, the script may force a request for an action script. The action script will then bridge the caller to a telephone number assigned in the account set-up options and call the telephone number assigned. If a multiple number set-up exists, then the action script will bridge all of the numbers assigned and connect the call to the first person that answers the call.

A step S616 may comprise recording a status of the telephone call. The status of the telephone call may be unanswered, busy, lost lead, completed, and the like. The status may also include the identity of the person or machine that answered the telephone call, the time that the telephone call began, the time that the telephone call ended, which telephone number was used, if an error occurred, and the like.

In step S618, a hang up script is executed. As explained above regarding FIG. 5, if the caller hangs up (or otherwise terminates the call), then a hang up process is initiated. The telephone call is then terminated in a step S620. The terminating step S620 may comprises executing a hang up script.

Asking a caller questions and processing recorded responses to the caller questions comprise a step S622. The ability to record calls may be turned on and off. As the caller answers each question, the response may be recorded over the telephone by the server manager and transmitted (for example, by FTP, File Transfer Protocol) to the server. The name of the files transmitted to the server may be a unique set of random numbers and letters.

After all of the questions are asked of the caller, a new script is generated by the server and then sent to the server manager (such as an action script, explained above regarding FIG. 5).

Transmitting the recording of the telephone call comprises a step S624. For example, the recorded responses may be sent (such as within the action script) to the server. The recorded telephone call may be transmitted via the Internet.

Transmitting the lost lead capture recording may be a step S626. A step S628 comprises storing the beginning time of the call and the ending time of the call (such as to determine elapsed time of the call). A step S630 comprises storing the responses within an audio file (such as a WAV file).

A person interested in determining details about calls made and calls received may review a report. For example, received calls to a specific telephone number may be viewed in a ledger format. The ledger format may include call statistics, such as the time that the call commenced and the time that the call ended. The ledger format may include a button available for a person to listen to a particular recorded telephone call.

The report may include graphs of telephone call data. For example, a person reviewing the report may view a graph of all calls received for each telephone number used in a campaign. The report may have a graph of the originating locations of all telephone calls. A graph may display calls received during time intervals. For example, a person may choose to view a display of all calls made during a one-hour interval or even a one-minute interval.

A person may also view financial details (such as revenue and expenses) regarding each telephone number used in a campaign.

At any time, a person may determine the number of telephone calls currently active, the identity of a particular caller, and the identity of a particular person receiving the telephone call. In instances when voicemail, lost lead capture, or other machine operations occur, a person may identify the particular machine performing the operation.

Another aspect of the present invention is shown in FIG. 7 regarding a flow chart of a method 700 for processing caller information. A step S702 comprises accumulating caller information associated with a first telephone number. A step S704 comprises converting the first telephone number to a first descriptive word. For example, a first telephone number may be converted into a word that identifies the caller or describes demographic information about the caller (such as male/female).

Forwarding the telephone call from the first telephone number to a second telephone number comprises a step S706. The method 700 may include transmitting audio to the caller before completing forwarding the telephone call from the first telephone number to the second telephone call. For example, music may be transmitted to the caller while on hold.

A step S708 comprises converting the second telephone number to a second descriptive word.

A step S710 comprises monitoring the telephone call, while requesting and recording a caller's name may comprise a step S712. The monitoring step S710 may comprise recording the telephone call. A step S714 comprises transmitting the monitored/recorded telephone call and the caller's telephone number to a recipient (for example, to the server manager).

Although the present invention has been described with reference to specific embodiments, these embodiments are illustrative only and not limiting. Many other applications and embodiments of the present invention will be apparent in light of this disclosure and the following claims.

What is claimed is:

1. A method for processing caller information, comprising:
answering a telephone call from a caller to a telephone number;
contacting a server;
generating a script;
querying a database to determine the identity of the entity assigned the telephone number;
sending the script to a server manager;
executing the script;
recording a status of the telephone call;
processing responses;
recording the telephone call;
terminating the telephone call; and
transmitting the recording of the telephone call via the Internet.

2. The method of claim 1, wherein the terminating step comprises executing a hang up script.

3. The method of claim 1, wherein the recording step comprises storing the responses within an audio file.

4. The method of claim 1, further comprising recording a lost lead capture.

5. The method of claim 1, wherein the processing step comprises storing the beginning time of the call and the ending time of the call.

6. A method for processing caller information, comprising: accumulating caller information associated with a first telephone number; converting the first telephone number to a first descriptive word; forwarding the telephone call from the first telephone number to a second telephone number; converting the second telephone number to a second descriptive word; monitoring the telephone call; requesting and recording a caller's name; and transmitting the monitored telephone call and the caller's telephone number to a recipient.

7. The method of claim 6, wherein the monitoring step comprises recording the telephone call.

8. The method of claim 6, further comprising storing the beginning time of the call and the ending time of the call.

9. The method of claim 6, further comprising executing a script; wherein the script includes executing an option selected from the group consisting of: recording the call, activating voicemail, recording a lost lead capture, requesting the caller's name, and forwarding the call.

10. The method of claim 9, further comprising bridging the caller to a telephone number assigned to the option.

11. The method of claim 6, further comprising transmitting audio to the caller before completing forwarding the telephone call from the first telephone number to the second telephone call.

* * * * *